United States Patent [19]

Ogiso et al.

[11] 3,889,277

[45] June 10, 1975

[54] DEVICE FOR CONTROLLING EXPOSURE FACTORS IN CAMERAS

[75] Inventors: Mitsutoshi Ogiso; Tetsuya Taguchi, both of Kawasaki, Japan

[73] Assignee: Canon Kabushiki Kaisha, Tokyo, Japan

[22] Filed: Aug. 30, 1973

[21] Appl. No.: 392,969

Related U.S. Application Data

[63] Continuation of Ser. No. 225,854, Feb. 14, 1972, abandoned.

[52] U.S. Cl. ........................ 354/36; 354/43; 354/51

[51] Int. Cl. ............................................ G03b 7/08

[58] Field of Search......... 95/10 CT, 10 CD, 10 CE; 354/50, 51, 60, 36, 37, 38, 43

[56] References Cited

UNITED STATES PATENTS

| | | | |
|---|---|---|---|
| 3,651,744 | 3/1972 | Okada | 95/10 CT |
| 3,721,167 | 3/1973 | Ogiso | 95/10 CT |

FOREIGN PATENTS OR APPLICATIONS

| | | | |
|---|---|---|---|
| 4,419,747 | 8/1969 | Japan | 95/10 CT |

*Primary Examiner*—Fred L. Braun
*Assistant Examiner*—Russell E. Adams, Jr.
*Attorney, Agent, or Firm*—Flynn & Frishauf

[57] ABSTRACT

The voltage to which a capacitor is charged, following the camera stop control operation in response to the rate of charge, is limited and regulated by a transistor switch with its switching path across the capacitor and its control path in a bridge circuit. A second light sensitive resistor is electronically switched in to control the discharge time for shutter time control operation, while the first light sensitive resistor is switched out. If the camera stop control opens the aperture to its maximum, a supplementary rapid charging path assures that the capacitor is charged to the voltage controlled by the limiter circuit. Automatic electronic triggering of the discharge is also shown.

13 Claims, 11 Drawing Figures

DEVICE FOR CONTROLLING EXPOSURE FACTORS IN CAMERAS

This is a continuation, of application Ser. No. 225,854, filed Feb. 14, 1972 now abandoned.

BACKGROUND OF THE INVENTION

1. Field of the Invention

The present invention relates to a device for controlling camera stop and shutter time and more particularly a device of the type for controlling exposure factors by the charging and discharging time of a time constant circuit comprising a photoelectric element or elements and a capacitor.

2. Description of the Prior Art

The present invention relates to an improvement of an exposure value controlling apparatus disclosed in the copending patent application Ser. No. 78391/70, filed Oct. 6, 1970, by KANEHIRO SORIMACHI et al, in which apparatus a camera stop is controlled by the charging time of a time constant circuit comprising a photoelectric element which receives the light from a subject and is connected in series with a capacitor while the shutter time is controlled by the discharging time.

When the light from a subject varies in intensity over a wide range, the voltage to which the capacitor is charge through the photoelectric element whose resistance varies in response to the intensity of the light from the subject, is not always the same so that there occurs an error in discharging time because when the resistance of the photoelectric element is high because the intensity of the light from the subject is low, the capacitor charges so slowly that the photoelectric element is high that in any reasonable interval the final voltage across the capacitor will vary with conditions and will not reach the predetermined charging voltage. To overcome this problem, the voltage across the capacitor is applied to an output switching circuit so that the latter is held until the voltage across the capacitor reaches a predetermined level, and a time required for a capacitor to reach a predetermined value is used as a time for setting an exposure control device such as a stop control device. Thereafter, the capacitor is switched to another discharge element such as a resistor by a switch to discharge therethrough the charge on the capacitor. A time required for the voltage across the capacitor to be discharged to a predetermined level is used to control the shutter speed. The use of a Zener diode to set the charge voltage from which discharge begins is helpful, but the variation of the Zener voltage with current is still sufficient to give rise to considerable error.

When a mechanical switch is used to switch the capacitor from the charging circuit to the discharge circuit, moreover the reliable and stable operation cannot be expected because of chattering of the contacts of the switch. Finally, the use of a single photoelectric element for both the charging and discharging resistances makes it difficult to operate both exposure control mechanisms over the desired range.

A principal object of the invention, accordingly, is to overcome the aforesaid problems encountered in the prior art devices.

SUMMARY OF THE INVENTION

According to the present invention, a regulating transistor switch is connected to both terminals of the capacitor of the time constant circuit so as to limit and regulate the voltage to which the capacitor is charged at a value slightly above the voltage at which the first operation is completed. As a further improvement separate charge and discharge resistors are provided, either or both of which may be photosensitive, in order to optimize the individual control characteristics.

Further improvement is also provided in the preferred embodiments by the provision of electronic means for switching from the charging to discharging condition of the circuit, and by providing a supplementary quick charging means operative when the control first actuated has reached or almost reached the end of its travel, thereby assuring that the capacitor reaches the predetermined charge level. Furthermore, an electronic changeover from the charging operation to the discharging operation may also be provided.

The above and other objects, features and advantages of the present invention will become more apparent from the following description of the preferred embodiments thereof taken in conjunction with the accompanying drawings.

DESCRIPTION OF THE PREFERRED EMBODIMENTS

Firstly, we explain the prior art.

Figure 1:
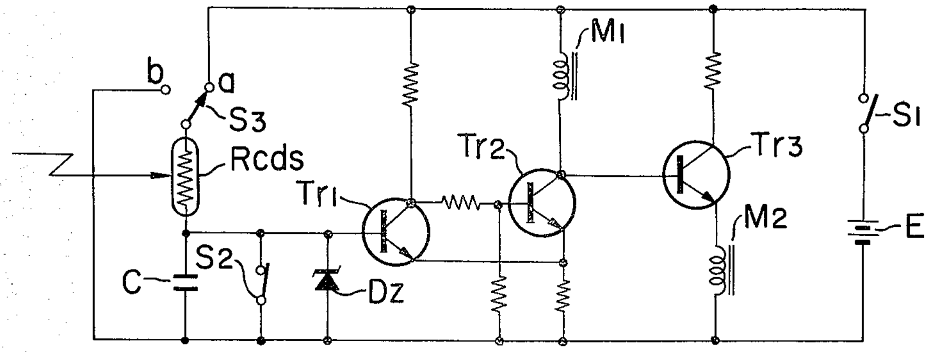
FIG. 1 is a diagram of the basic circuit of the prior art charge-discharge type exposure control device.
Figure 2:
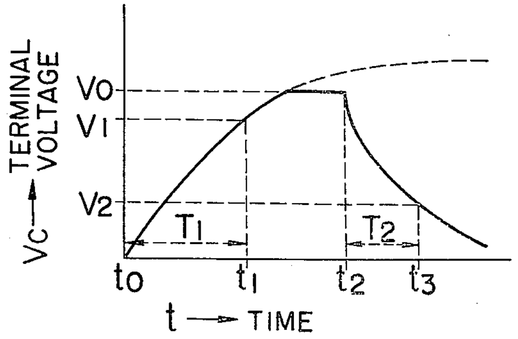
FIG. 2 is a graph illustrating the charging and discharging characteristic curve of the capacitor thereof.
Figure 3:
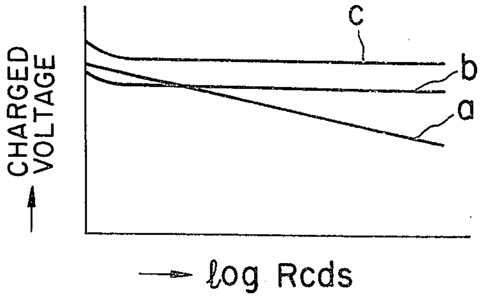
FIG. 3 is a graph illustrating comparatively the characteristic curves of the charge voltage of the respective capacitors in the prior art device and in the device in accordance with the present invention.

Prior Art, FIGS. 1–3

FIG. 1 is a diagram of a prior art electronic shutter circuit of the type utilizing the charging and discharging time of a capacitor, and the charging and discharging characteristic curve is illustrated in FIG. 2 in which the voltage Vc across the capacitor is plotted against the time *t*. The mode of operation of the electronic shutter circuit shown in FIG. 1 is as follows. The moving contact of a switch $S_3$ closes the fixed contact *a*, and a power switch $S_1$ is closed. Then a transistor Tr1 is cut off whereas a transistor Tr2 is in saturation. When a switch S2 is opened in response to the shutter release operation, a capacitor C is charged (at $t=t_0$ in FIG. 2) through a photoelectric element Rcds, and aperture blades (not shown) are actuated toward the wide opened position by an electromagnet M1. When the voltage Vc across the capacitor C reaches the trigger voltage V1 of a Schmitt circuit comprising the transistors Tr1 and Tr2 at $t = t1$, the circuit is switched, that is the transistor Tr1 is driven into saturation whereas the transistor Tr2 is cut off. As a result, the movement of the aperture blades is stopped and is locked. As the voltage Vc increases it reaches the Zener breakdown voltage $V_D$, after which the voltage across the capacitor C remains constant. When the shutter button is further depressed, the moving contact of the switch S3 is switched to the fixed contact *b* at $t = t2$ so that the shutter is opened and the discharge of the capacitor C through the photoelectric effect element Rcds is started. When the voltage Vc across the capacitor C drops to the lower trigger voltage V2 at $t = t4$, the circuit is reverts to the original state, that is transistor Tr1 is cut off whereas the transistor Tr2 is driven into saturation. In this case, a third transistor Tr3 is cut off so that a shutter blade driving member which has been locked in position is now released, and hence the shutter is closed. Thus, the exposure is accomplished.

In summary, the aperture stop is controlled in response to the charging time T1 of the capacitor C, whereas the shutter time is controlled in response to the discharging time T2. When the voltage across the capacitor C is zero or at a predetermined value when the charging of the capacitor C is started, the charging time T1 which is dependent upon the resistance of the photoelectric element Rcds can be maintained constant so far as the resistance of the photoelectric element Rcds is constant. If the Zener breakdown voltage $V_D$ is sufficiently constant, the discharge time T2 can be made dependent upon the resistance of the photoelectric element Rcds since the discharge of the capacitor C is started at $Vc = V_D$. For this purpose, in the electronic exposure control circuit shown in FIG. 1, a Zener diode Dz is connected in parallel with the capacitor C to provide a reference voltage. However, the resistance of the photoelectric element in series with the Zener diode Dz varies over a wide range depending upon the intensity of light from a subject, so that the variation in voltage across the Zener diode Dz cannot be avoided.

In FIG. 3, the charge voltage Vc is plotted against the resistance of the photoelectric element Rcds on a logarithmic resistance scale. The characteristic curve *a* gradually falls when the photoelectric element is connected as shown in FIG. 1, whereas the relatively flat characteristic curves *b* and *c* are obtained according to the present invention as will be described in more detail hereinafter. The Schmitt circuit of the type shown in FIG. 1 is triggered when the input voltage reaches the two predetermined voltages V1 and V2 across the capacitor C, and the difference between the voltages V1 and V2 is the hysterisis of the Schmitt circuit.

Next, the embodiment of this invention is described.

The Invention, FIGS. 4–9

Figure 4A:
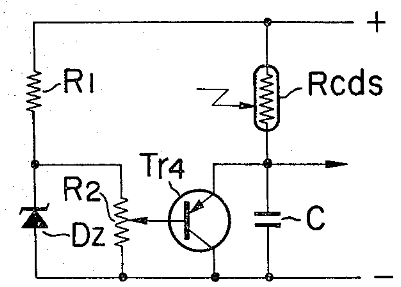
FIGS. 4*a*, *b* and *c* are basic circuit diagrams showing featu es of the device in accordance with the present invention.
Figure 4B:
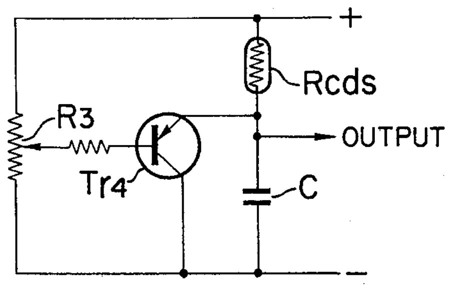
Figure 4C:
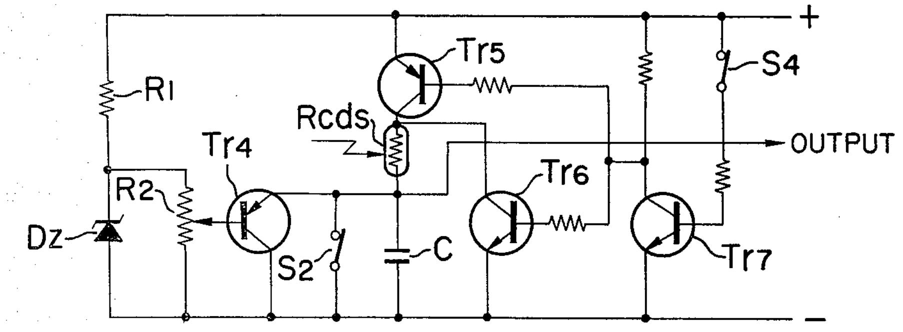

The essential parts of the device in accordance with the present invention are illustrated in FIGS. 4-*a*, 4-*b* and 4-*c*, respectively. The arrangements shown in FIGS. 4-*a* and 4-*b* serve to make the voltage to which the capacitor C is charge constant independently of the resistance of the photoelectric element Rcds. That is, the collector and emitter of a transistor Tr4 are connected to the terminals of the capacitor respectively, and the base input voltage is appropriately controlled by a resistor R2 or R3 so that the characteristic curves *b* and *c* may be obtained as shown in FIG. 3.

In the circuit shown in FIG. 4-*a*, to the base of the transistor Tr4 is applied the voltage $V_B$ obtained by dividing the Zener breakdown voltage Vz of the Zener diode Dz by a variable resistor R2. As a result, the transistor Tr4 is driven into saturation when the emitter voltage $V_E$ of the transistor Tr4 and hence the voltage Vc across the capacitor C reaches $V_E = Vc = V_B + V_{BE}$, and then the current which otherwise flow into the capacitor c through the photoelectric element Rcds, flows through the transistor Tr4. As a result, as shown by the characteristic curve *b* in FIG. 3, the voltage to which the capacitor is charge may be maintained at a constant value of $V_B + V_{BE}$.

In the circuit shown in FIG. 4-*b*, the base input voltage of the transistor Tr4 is adjusted by the variable resistor R3. This arrangement is particularly advantageous when there is no variation in power source voltage and when it is desired to have a high charging voltage across the capacitor C. The characteristic curve of this arrangement is indicated by *c* in FIG. 3.

The circuit shown in FIG. 4-*c* is provided with the constant charge limit circuit shown in FIG. 4-*a*, while in this case the switch for switching the charging and discharge of the capacitor C is replaced by an electronic switching circuit. That is, when a charging-discharging switch S4 is closed, the transistor Tr7 is driven into saturation so that the transistor Tr5 is in saturation whereas the transistor Tr6 is cut off. As a consequence, the charging circuit is formed with the photoelectric element Rcds and the capacitor C, and the charging of the capacitor C is started when the count-start switch S2 in the time-constant circuit is opened. When the voltage across the capacitor C reaches at or near the base voltage of the transistor Tr4, the latter is turned on, and then the voltage to which the capacitor C is charge can be maintained constant as in the case of the circuit illustrated in FIG. 4-*a*. When the switch S4 is turned off, the transistors Tr7 and Tr5 are cut off whereas the transistor Tr6 is driven into conduction. As a consequence the capacitor C is discharged through the photoelectric effect element Rcds and the transistor Tr6. In the circuit shown in FIG. 4-*c*, the malfunction which is caused by the chattering of the contacts of the switch S3 in the circuit shown in FIG. 1 can be prevented, and the switching can be made with a higher degree of accuracy in time.

Figure 5:
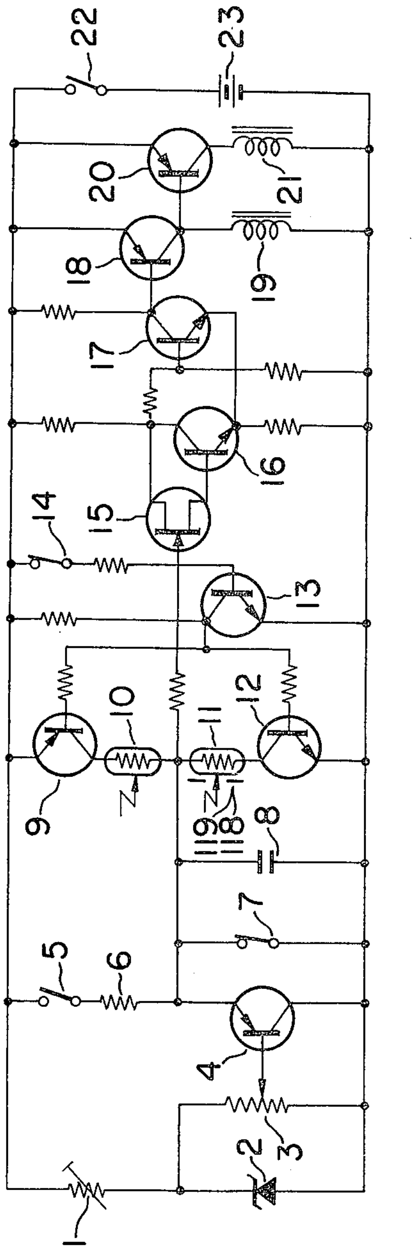
FIG. 5 is a circuit diagram of a first embodiment of the device in accordance with the present invention.
Figure 7:
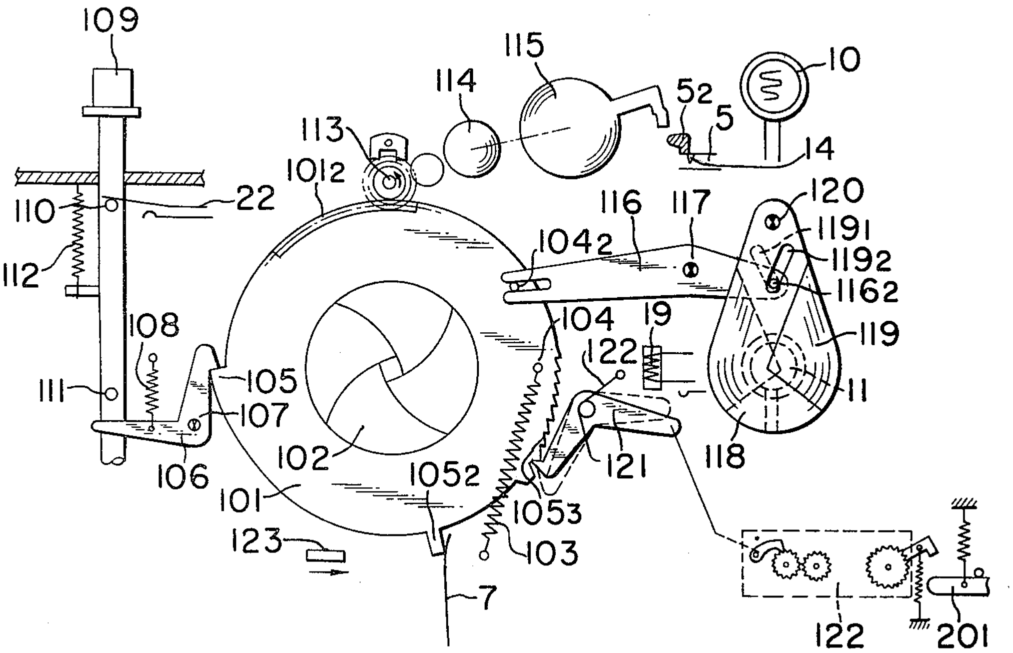
FIGS. 7 and 8 are diagrammatic views of a stop setting device and a shutter mechanism associated with the electronic circuit shown in FIG. 5.
Figure 8:
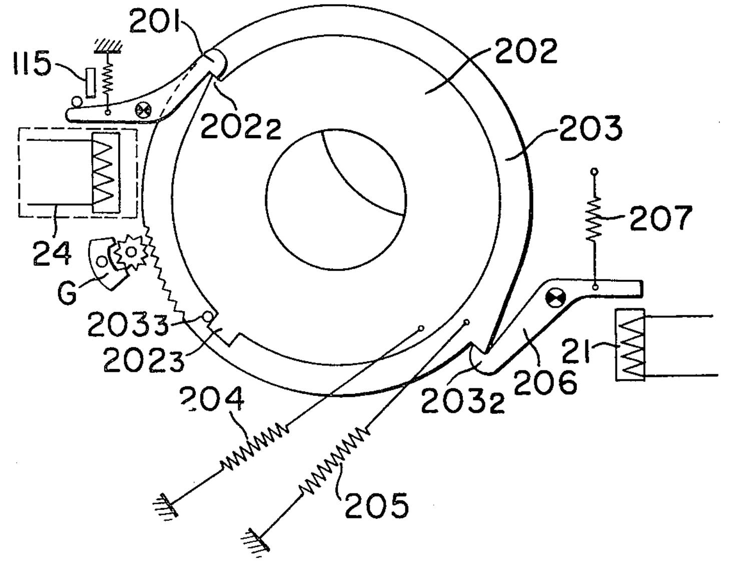

FIG. 5 is a diagram of a control circuit of a device for controlling camera stop and shutter time in accordance with the present invention incorporating the circuit shown in FIG. 4-*c*. The mechanism on the side of the camera is illustrated in FIGS. 7 and 8. In FIG. 5, the light from the subject is incident upon two photoelectric elements 10 and 11, the element 10 being used for controlling the stop whereas the element 11 operates to control the shutter time. These elements 10 and 11 are switched by the circuit shown in FIG. 4-*c* because of the reason to be described hereinafter. That is, it is preferable that the photoelectric element 11 used for controlling the shutter speed have the characteristic of $\gamma = 1$, and the present invention uses such photoelectric element. However, when it is desired to control the sector ring which rotates at a predetermined angular velocity in order to control the aperture, the ratio in change of resistance of a photoelectric element having the characteristic of $\gamma = 1$ is too great for each of various stops. Therefore a photoelectric element having $\gamma = 0.5$ is preferable for controlling the camera stop. Consequently in the embodiment shown in FIG. 5, a photoelectric element 10 having $\gamma = 0.5$ is used for controlling the stop and hence the charging of the capacitor, whereas the photoelectric element 11 having $\gamma = 1$ is used for controlling the shutter speed and hence the discharge of the capacitor.

The control circuit shown in FIG. 5 comprises 1 a voltage-division resistor; 2, a Zener diode; 3, a variable resistor for dividing the voltage across the Zener diode and applying the divided voltage to the base of a transistor 4, which is used to maintain the voltage charged across the capacitor constant; 5, a switch; 6, a resistor having a low resistance through which is charged the capacitor within a short time as will be described in more detail hereinafter; 7, a switch for starting the actuation of the shutter; 8, a capacitor in a time constant circuit; 9, 12, and 13, transistors constituting a charging-discharging switching circuit; 10, the photoelectric element with $\gamma = 0.5$ for charging the capacitor; 11, the photoelectric element with $\gamma = 1$ for discharging the capacitor; 14, a charging-discharging switch; 15–21, elements constituting a transistorized switching circuit, (15 being a FET; 16, 17, 18, and 20, transistors; 19, a magnet for controlling the stop; and 21, a magnet for controlling the shutter speed); 22, a power source switch; and 23, a battery.

A stop control device which in turn is controlled by the magnet 19 is illustrated in FIG. 7. An aperture or stop blade actuating ring 101 has a cam slot (not shown) into which are fitted the pins (not shown) of aperture or stop blades 102 so that the stop formed by the blades 102 is controlled in response to the angle of rotation of the stop blade actuating ring 101 in the manner well known in the art. A spring 103 is loaded between a pin 104 extending from the actuating ring 101 and a pin extending from the stationary member of the camera body, and a release lever 106 pivoted with a pin 107 and loaded with a return spring 108 is normally in engagement with a stepped portion 105 of the actuating ring 101. A shutter release member 109 is provided with pins 110 and 111 and a return spring 112. The switch 7 is actuated by a projection $105_2$ of the actuating ring 105, and a toothed portion $101_2$ formed along a part of the periphery of the actuating ring 101 is normally in engagement with a governor pinion 113 which, together with gears 113, 114 and 115, constitutes a retarding or delayed motion mechanism. When the stop blades 102 are almost wide opened, the projection extending from the gear 115 rides past a cam $5_2$ of the switch 5, thereby immediately turn on the latter. When a shutter release lever 121 is actuated by the magnet 19, a retarding mechanism or a delayed-action mechanism 122 is started so that after predetermined time delay a shutter release member 201 is actuated to release a shutter shown in FIG. 8. The bifurcated end of a connecting lever 116 pivoted with a pin 117 is in engagement with a pin $104_2$ extending from the actuating ring 101, and a pin $116_2$ at the other end of the connecting lever 116 is fitted into cam slots $118_2$ and $119_2$ of stop blades 118 and 119 which are pivoted to the stationary member of the camera body with a pin 120. The photoelectric element 11 is disposed behind the stop means comprising the stop blades 118 and 119. The lever 121 which is normally biased to rotate in the clockwise direction under the force of a spring 122, is actuated by the magnet 19 to be released from the toothed portion $105_3$ formed along a part of the periphery of the actuating ring 101. As a consequence the actuating ring 101 is rotated in the clockwise direction under the force of the spring 103. A cocking member 123 is adapted to be displaced into engagement with the projection $105_2$ of the actuating ring 101 by a cocking mechanism (not shown) to cause the actuating ring 101 to rotate in the counterclockwise direction against the spring 103, whereby the actuating ring 101 is cocked.

Next referring to FIG. 8 illustrating the shutter mechanism, a shutter blade is interposed between a pair of sector rings 202 and 203 of the type well known in the art, and the sector rings 202 and 203 are driven by springs 204 and 205, respectively. When the shutter is charged, the switch 22 is closed so that the magnet 21 is energized to attract a release lever 206. As a consequence, the release lever 206 is normally in engagement with a stepped portion $203_2$ of the sector ring 203 against the force of a spring 207. A projection $202_3$ of the sector ring 202 is in engagement with a pin $203_3$ extending from the sector ring 203. A slow-governor G is engaged with a toothed portion of the sector ring 203.

Next the mode of operation will be described. The shutter mechanism may be mechanically charged as the film advance lever or the like (not shown) is cocked, and the switches 7 and 14 are closed. When upon depression of the shutter release member 109 the power source switch 22 is closed as the pin 110 is lowered, the transistors 17 and 18 in the switching circuit are turned on so that the magnet 19 is energized. As a consequence the actuating ring 101 (See FIG. 7) starts to rotate at a constant angular velocity under the force of the spring 103 to control the stop. In response to the rotation of the actuating ring 101, the switch 7 is closed and hence the transistor 9 is turned on whereas the transistor 12 is cut off. As a result, the capacitor 8 is charged through the photoelectric element 10. In this case the charging speed is dependent upon the intensity of the light incident upon the element 10. When the shutter release member 109 is further depressed, the voltage across the capacitor is increased and reaches the trigger voltage V1 in FIG. 2 so that the transistors 15 and 16 are driven into conduction whereas the transistors 17 and 18 are cut off. As a consequence the magnet 19 is de-energized, and the lever 121 is returned under the force of the spring 122 to engage with the toothed portion $105_3$ of the actuating ring 101, whereby the actuating ring 101 is locked in position. Thus the stop optimum for the brightness of the subject is set, and in response to this operation, the stop is determined by the stop blades 118 and 119 disposed in front of the photoelectric effect element 11. The voltage across the capacitor 8 reaches the voltage $V_D$ (See FIG. 2), and when the switch 22 is closed, the transistor 20 is turned on so that the magnet 21 is energized to hold the shutter release lever 206.

When the shutter release lever 201 is released (FIG. 7 and 8) by the projection of the gear 115 in the retarding or delayed action mechanism 113 to 115, the sector ring 202 (FIG. 8) is released to open the shutter blade, whereby the exposure is started. Concurrently the charging-discharging switch 14 is opened by the lever 201 so that the transistor 9 is cut off whereas the transistor 12 is driven into conduction. As a consequence, the charge on the capacitor 8 is now discharged through the photoelectric element 11 whose resistance is dependent upon the intensity of the light from the subject. When the voltage across the capacitor reaches the trigger voltage V2 in FIG. 2, the transistor 20 is cut off so that the magnet 21 is de-energized. As a consequence, the lever 206 is rotated in the clockwise direction under the force of the spring 207 so that the sector ring 203 is released from the lever 206 start the rotation. Therefore the shutter blade is closed, whereby the exposure is completed.

In the mode of operation so far described above, the actuating ring 101 is locked in position before the stop blades 102 are wide opened. However, there is a case in which since the brightness of the subject is not sufficient, the shutter mechanism is actuated when the stop blades are wide opened but before the voltage across the capacitor reaches the voltage $V_D$ to start the exposure. When the shutter time is controlled in response to the discharge of the capacitor, the shutter time becomes too short so that the optimum exposure cannot be attained. In order to overcome this problem, the present invention provides the switch 5 which is closed for a very short time when the shutter mechanism is actuated but before the actuating ring 101 is stopped, that is before the stop blades 102 are wide opened, so that the capacitor 8 may be rapidly charged through the resistor 6 of a low resistance during this short time. That is, before the actuating ring 101 is rotated so that the aperture blades 102 are wide opened, the switch 5 is closed so that the capacitor is charged to the voltage $V_D$ in a very short time. Thus, the problem described above can be overcome.

Figure 6:
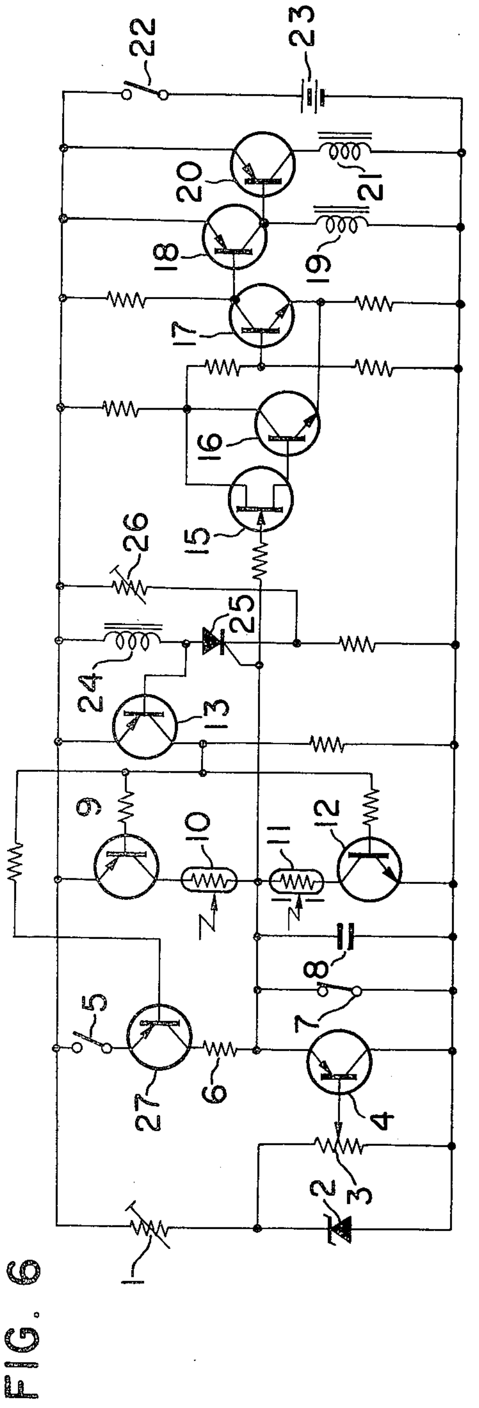
FIG. 6 is a diagram of a second embodiment of the present invention.

Next referring to FIG. 6 illustrating the second embodiment of the present invention, those elements similar to those shown in FIG. 5 are designated by same reference numerals. In the second embodiment, instead of the mechanical charging-discharging switch, an electronic switch comprising a silicon controlled rectifier SCR and a magnet is used. A magnet 24 for actuating the shutter mechanism is shown at 24 in FIG. 8 encircled by the dashed lines. A variable resistor 26 is used to set the operating point of the SCR 25, and a transistor 27 is used to interrupt the charging circuit when the switch 5 is closed and the capacitor is discharging.

The mode of operation of the second embodiment is substantially similar to that of the first embodiment shown in FIG. 5. When the voltage of the capacitor 8 which is charged through the photoelectric element 10 reaches the voltage $V_D$ or immediately before the voltage reaches $V_D$, it is applied to the control electrode of the SCR 25 to turn it on. As a result, the magnet 24 is energized, and the transistor 9 in the switching circuit is cut off whereas the transistor 12 is turned on so that the capacitor 8 is discharged through the photoelectric element 11 and the transistor 12. When the discharge of the capacitor 8 is started, the transistor 27 is immediately cut off so that the charging through the resistor 6 of a low resistance of the capacitor can be prevented.

Figure 9:
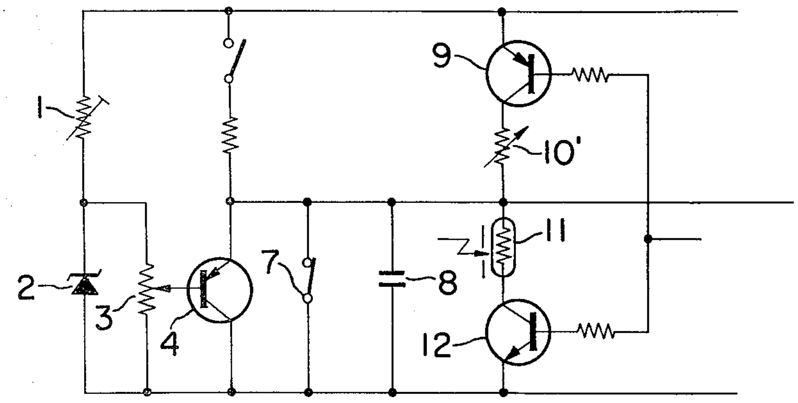
FIG. 9 which appears on the same sheet as FIGS. 4*a*, *b* and *c*, is a diagram of a variation of the embodiment shown in FIG. 5.

In the embodiments shown in FIGS. 5 and 6, the two photoelectric elements 10 and 11 are inserted in the charging and discharging paths of the capacitor 8, respectively so that the stop and the shutter speed are determined in response to the intensity of light incident upon these two elements. However one of the elements 10 and 11 may be replaced by a variable resistor which may be manually set so that the manual stop and/or shutter speed setting may be effected as shown in FIG. 9. That is, the circuit shown in FIG. 9 is variation of the embodiment illustrated in FIG. 5. In place of the photoelectric element 10, a manually adjustable variable resistor 10' is inserted so that the stop may be adjusted manually.

As described hereinabove, according to the present invention the capacitor in the device for controlling camera stop and shutter speed is charged to a predetermined level independently of the intensity of light from the subject, and the stop and the shutter speed are controlled by the charging and discharging time of the capacitor, respectively and independently of each other. Therefore, the errors in control time encountered in the prior art devices can be eliminated, and the electronic shutter device which is reliable and accurate in operation may be provided so that the camera design may be much facilitated. Furthermore, the optimum exposure factors can be attained in a simple manner.

We claim:

1. A device for sequentially controlling a diaphragm aperture means and a shutter means comprising in combination:

a power source;

a first switching means having a capacitor across its input and arranged to be switched from a first to a second condition when said capacitor charges up past a first predetermined voltage and to be switched from said second to said first condition when said capacitor discharges past a second lower predetermined voltage;

diaphragm aperture control means connected to said first switching means and said diaphragm aperture means, said control means comprising:

aperture varying means connected with said diaphragm aperture means for varying diaphragm aperture in accordance with the length of a time period defined by said first switching means while said capacitor charges, and electrically controlled means connected with said aperture varying means and said first switching means for controlling said varying means to define the aperture of said diaphragm aperture means;

shutter control means connected to said first switching means and said shutter means to define the open time of said shutter means by said first switching means while said capacitor discharges;

an input circuit for said first switching means including said capacitor and determining its rate of charge and its rate of discharge and including:

a first and second variable resistor means, a second switching means having two conditions such that in one of said conditions, and then only, said first variable resistor means is placed in a charging path for said capacitor and in the other of said conditions, and then only, said second variable resistor means is placed in a discharge path for said capacitor, and circuit means associated with said input circuit for limiting the voltage to which said capacitor is charged at a constant level above said first predetermined voltage, which level is not subject to variation for any photographing condition, said circuit means including a transistor having a predetermined constant voltage applied to its base electrode and having another of its electrodes connected to said capacitor for overflowing current therefrom when the voltage of the charged capacitor passes a constant voltage level lower than the voltage of said power source.

2. A device for sequentially controlling a diaphragm aperture means and a shutter means as set forth in claim 1 wherein at least one of said first and second resistor means comprises a photoelectric element whose resistance is varied in response to the intensity of light from a subject.

3. A device for sequentially controlling a diaphragm aperture means and a shutter means as set forth in claim 1 wherein at least one of said first and second resistor means comprises a photoelectric element whose resistance may be adjusted depending upon a desired exposure factor.

4. A device for sequentially controlling a diaphragm aperture means and a shutter means as set forth in claim 1 wherein said transistor has its emitter-collector path connected in parallel with said capacitor.

5. A device for sequentially controlling a diaphragm aperture means and a shutter means as set forth in claim 4 wherein said first variable resistor means is connected to the emitter of said transistor.

6. A device for sequentially controlling a diaphragm aperture means and a shutter means as set forth in claim 4 wherein said circuit means comprises a Zener diode connected so as to regulate said predetermined constant voltage applied to the base electrode of said transistor.

7. A device for sequentially controlling a diaphragm aperture means and a shutter means as set forth in claim 1 wherein said second switching means comprises a first and second semiconductor switching circuits connected in series with said first and second variable resistor means respectively, and the charging and discharging of said capacitor are effected through said first variable resistor means and said first semiconductor switching circuit, and through said second variable resistor means and said second semi-conductor switching circuit, respectively.

8. A device for sequentially controlling a diaphragm aperture means and a shutter means as set forth in claim 7 wherein said second switching means further comprises a third switching means adapted to be activated in response to a predetermined charging voltage across said capacitor, the output terminal of said third switching means being connected to the input terminals of said first and second semiconductor switching circuits so that said first semiconductor switching circuit is cut off, whereas said second semiconductor switching circuit is driven into saturation by operation of said third switching means, whereby the discharging of said capacitor through said second semiconductor switching means is initiated.

9. A device for sequentially controlling a diaphragm aperture means and a shutter means as set forth in claim 8 wherein said third switching means has its output terminal connected to electromagnet means for releasing mechanical means for initiating operation of either said shutter control means or said diaphragm aperture control means.

10. A device for sequentially controlling a diaphragm aperture means and a shutter means comprising in combination:

a power source;

a first switching means having a capacitor across its input and arranged to be switched from a first to a second condition when said capacitor charges up past a first predetermined voltage and to be switched from said second to said first condition when said capacitor discharges past a second lower predetermined voltage;

means for controlling said diaphragm aperture means in response to the time said first switching means remains in one of its conditions;

means for controlling said shutter means in response to the time said first switching means remains in the other of its conditions;

an input circuit for said first switching means including said capacitor and determining its rate of charge and its rate of discharge and including:

a first and second variable resistor means;

a second switching means comprising a first and second semiconductor switching circuits connected in series with said first and second variable resistor means respectively, and arranged to provide charging of said capacitor through said first variable resistor means and said first semiconductor switching circuit and to effect discharging of said capacitor through said second variable resistor means and said second semiconductor switching circuit;

circuit means associated with said input circuit for limiting the voltage to which said capacitor is charged at a constant level above said first predetermined voltage, said circuit means including a transistor having a predetermined constant voltage applied to its base electrode and having another of its electrodes connected to said capacitor for overflowing current therefrom when the voltage of the charge capacitor passes a constant voltage level lower than the voltage of said power source, and a third switching means in circuit with an additional rapid charging path for said capacitor and acutated by mechanical means operated by or with said diaphragm aperture means or said shutter means for rapidly charging said capacitor through said additional charging path at or near the end of the mechanical range of said diaphragm aperture control means or said shutter means for assuring that said capacitor will be charged to said constant level prior to its discharge even under poor light conditions.

11. A device for sequentially controlling a diaphragm aperture means and a shutter means comprising in combination:

a power source;

a first switching means having a capacitor across its input and arranged to be switched from a first to a second condition when said capacitor charges up past a first predetermined voltage and to be switched from said second to said first condition when said capacitor discharges past a second lower predetermined voltage;

diaphragm aperture control means connected to said first switching means and said diaphragm aperture means, said control means comprising:

aperture varying means connected with said diaphragm aperture means for varying the diaphragm aperture in accordance with the length of a time period defined by said first switching means while said capacitor charges, and electrically controlled means connected with said aperture varying means and said first switching means for controlling said varying means to define the aperture of said diaphragm aperture means;

shutter control means connected to said first switching means and said shutter means to define the open time of said shutter means by said first switching means while said capacitor discharges;

an input circuit for said first switching means including said capacitor and determining its rate of charge and its rate of discharge and having charging and discharging path means connected permanently to one terminal of said capacitor and including:

at least one photosensitive resistor means, a pair of switchable connections respectively to a source of charging potential and to the opposite terminal of said capacitor for alternately closing a charging path or a discharging path for said capacitor, and a second switching means for normally closing said switchable connection to said source of charging potential except for a period following substantial completion of charging of said capacitor and lasting at least until the exposure is completed, during which period said switchable connection to the opposite terminal of said capacitor is closed by said second means, and circuit means associated with said input circuit for limiting the voltage to which said capacitor is charged at a constant level above said first predetermined voltage, said circuit means including a transistor having a predetermined constant voltage applied to its base electrode and having another of its electrodes connected to said capacitor for overflowing current therefrom when the voltage of the charged capacitor passes a constant voltage level lower than the voltage of said power source.

12. A device for sequentially controlling a diaphragm aperture means and a shutter means as set forth in claim 11 wherein said switchable connections include the respective switching paths of a second and third transistors and a fourth transistor adapted to switch said second or said third transistor into conducting condition according to whether said fourth transistor is conducting or nonconducting.

13. A device for sequentially controlling a diaphragm aperture means and a shutter means as set forth in claim 12 wherein said second and third transistors are of complementary types and have their emitters connected respectively to said source of charging potential and to said opposite terminal of said capacitor.

* * * * *

UNITED STATES PATENT OFFICE

CERTIFICATE OF CORRECTION

Patent No. 3,889,277 Dated June 10, 1975

Inventor(s) Mitsutoshi OGISO et al.

It is certified that error appears in the above-identified patent and that said Letters Patent are hereby corrected as shown below:

On the cover page, first column, following item [63] entitled "Related U.S. Application Data", insert

[30] Foreign Application Priority Data

February 22, 1971 Japan .................... 8500/1971

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*